UNITED STATES PATENT OFFICE.

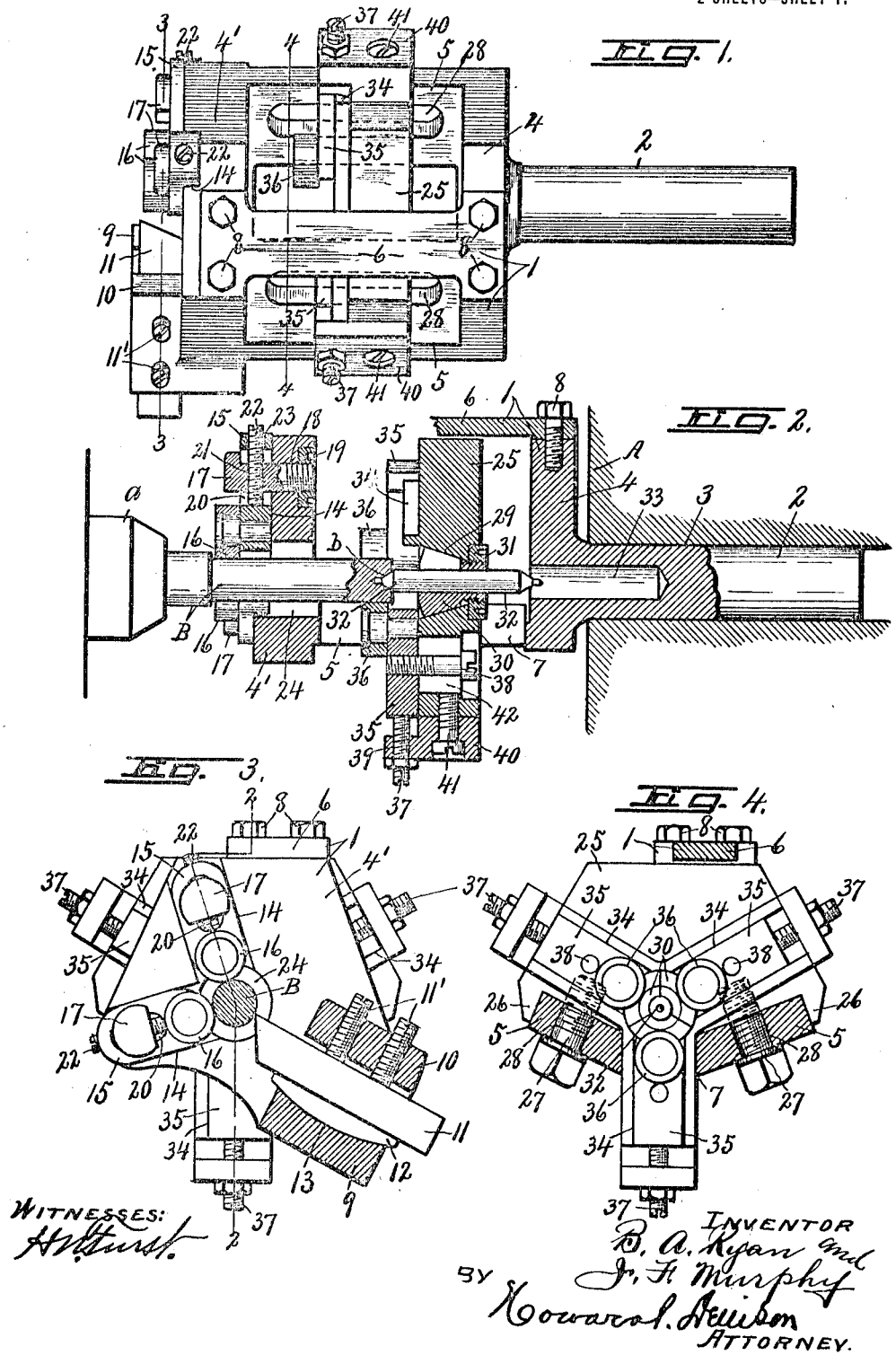

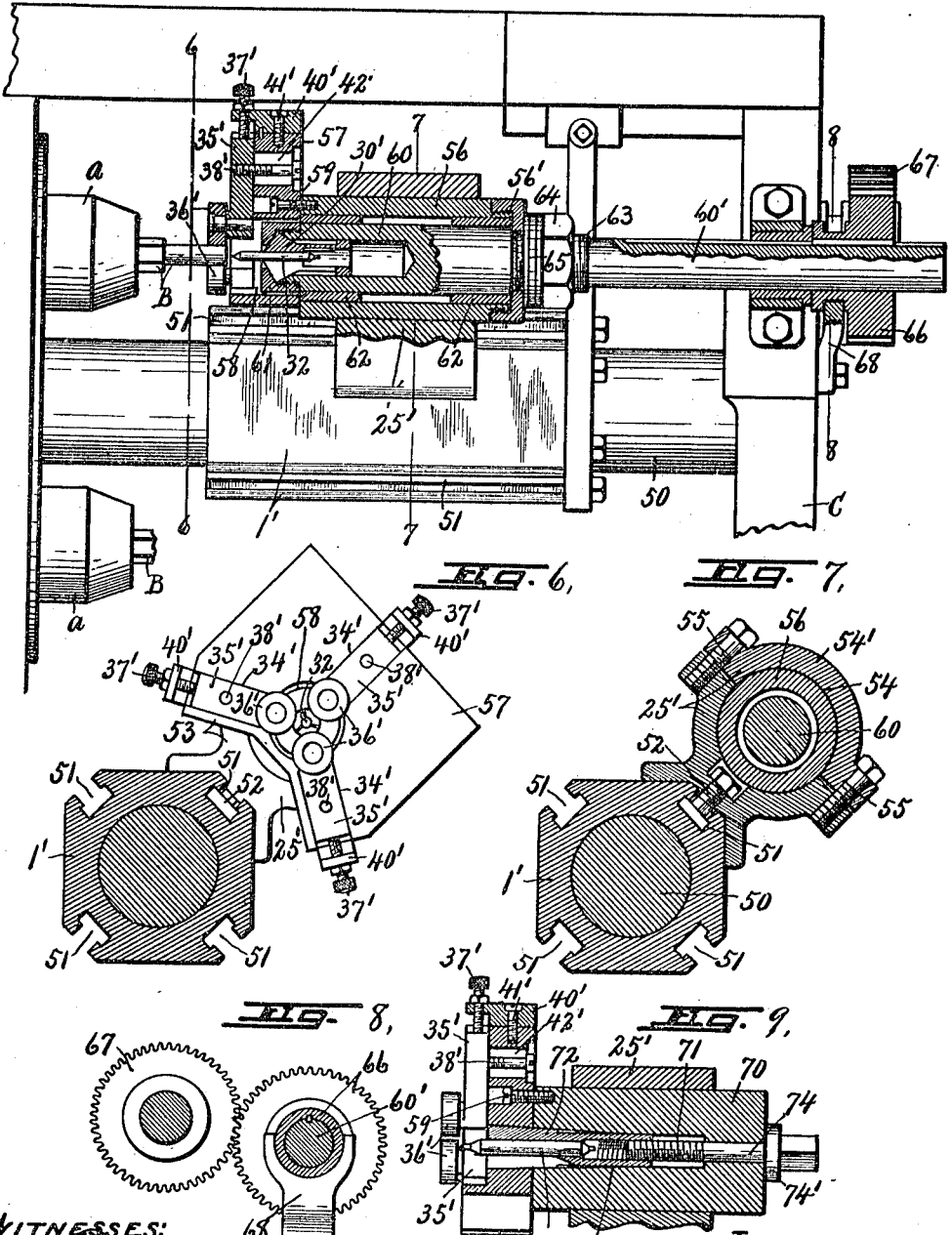

JOHN F. MURPHY AND BERNARD A. RYAN, OF SYRACUSE, NEW YORK.

TOOL-HOLDER FOR SCREW-MACHINES.

1,274,436.  Specification of Letters Patent.  Patented Aug. 6, 1918.

Application filed April 23, 1917. Serial No. 163,954.

*To all whom it may concern:*

Be it known that we, JOHN F. MURPHY and BERNARD A. RYAN, citizens of the United States of America, and residents, respectively, of Syracuse, in the county of Onondaga, in the State of New York, have invented new and useful Improvements in Tool-Holders for Screw-Machines, of which the following, taken in connection with the accompanying drawings, is a full, clear, and exact description.

This invention relates to certain improvements in screw machines of the single spindle or automatic multiple spindle type, and refers more particularly to means thereon for cutting a center in one end of the work while the latter is still held in the usual work-holder of the machine, or just prior to its removal therefrom after the completion of the last operation by said machine.

In many instances, the work turned out by screw machines of this character requires further finishing operations in other machines, and it, therefore, becomes necessary to drill or otherwise impress a centering hole in one end of the work, after it is taken from the screw machine in order that it may be properly centered in said other machines for further operations thereon.

This recentering of the work in other machine or machines for drilling the centering hole, or for other operations, is extremely difficult and not always absolutely reliable, particularly when the result of such operations must be of a high degree of accuracy with reference to the axis of said work as it leaves the screw machine, and the main object of our present invention is to provide the screw machine with simple means whereby the centering hole may be formed with absolute accuracy in one end of the work while it is still held in the work-holder of said machine, and preferably simultaneously with or immediately following the last operation on the work preparatory to its removal.

Other objects and uses relating to specific parts of the device will be brought out in the following description.

In the drawings:

Figure 1 is a top plan of a tool-holder for single spindle screw machines showing our improved work-centering device mounted thereon.

Fig. 2 is a longitudinal vertical sectional view of the device shown in Fig. 1 mounted in the screw machine and showing the chuck through which the work is fed.

Figs. 3 and 4 are transverse vertical sectional views taken, respectively, on lines 3—3 and 4—4, Fig. 1.

Fig. 5 is a front elevation, partly in section, of a portion of an automatic multiple spindle screw machine showing the application of our invention thereto.

Figs. 6 and 7 are transverse vertical sectional views taken, respectively, on lines 6—6 and 7—7, Fig. 5.

Fig. 8 is a detail transverse sectional view taken on line 8—8, Fig. 5, showing the gears for driving the rotary spindle which carries the work-centering tool.

Fig. 9 is a detail sectional view of a modified form of work-centering device, in which the support for the centering tool is fixed against rotation, as distinguished from the rotary tool-supporting spindle shown in Fig. 5, and showing also means for tightening and releasing the tool chuck.

In Figs. 1 to 4, inclusive, we have shown a head —1— as provided with a spindle —2— adapted to be secured in a socket —3— of a carriage —A— of a screw machine coaxial with a rotary spindle —*a*—, through which the work, as a bar —B—, is adapted to be fed in any well-known manner common to screw machines of this character.

The head —1— consists of a pair of end walls —4— and —4'— arranged in spaced relation lengthwise of the axis of the spindles —2— and —*a*— and connected by a lower pair of lengthwise bars —5— and an upper lengthwise bar —6—, all arranged about said axis in spaced relation circumferentially.

The bars —5— are preferably formed integral with the end walls —4— and —4'— and are disposed at an angle to each other tangential to said axis with their inner edges in spaced relation to form a lengthwise slot —7— in the lower side of the head, the upper connecting bar —6— being removable to permit the insertion and removal of my improved work centering device, presently described, and is held in place by bolts —8—, the purpose of the bar —6— being to assist in bracing the head against swinging movement, and at the same time leaving ample space within the head for the reception of the work-centering device.

The end wall —4'— is provided with axially extending flanges —9— and —10— near the lower front portion thereof and in spaced relation to receive between them a cutting tool —11— and a suitable key —12— having a convex lower face seated in a concave face —13— in the lower flange —9— to enable the tool —11— to be adjusted radially or tilted to different angles relatively to the work —B—, the tool being held in place by clamping screws —11'—, Fig. 3.

The outer end face of the end wall —4'— is provided with radial grooves or channels —14— disposed at substantially right angles to each other for receiving radially adjustable blocks —15— carrying at their inner ends rollers —16— to engage the work —B— opposite the cutting edge of the tool —11—, and constituting back rests for centering the work and preventing springing or chattering thereof under the cutting action of the tool —11—.

These blocks are held in place by axially projecting studs —17— having their outer ends enlarged and engaged with the adjacent faces of the blocks and their inner ends passed through apertures —18— in the end wall —4'— and engaged by nuts —19—, whereby the blocks —15— may be tightly clamped between the heads of the studs and bases of the grooves —14— of the end walls —4'—.

The shanks of the studs —17— extend through radially elongated slots —20— in their respective blocks —15— and are provided with transverse threaded apertures —21— for receiving radial screws —22— which extend lengthwise through the slots —20— and have their inner ends engaged with the portions of the blocks —15— at the inner ends of said slots, while their outer ends extend through relatively large openings —23— in the outer ends of the blocks, as shown more clearly in figure, where they are accessible by engagement with a suitable tool for turning them, and thereby adjusting both blocks to bring the rollers —16— into engagement with the periphery of the work —B—.

The end wall —4'— is also provided with a lengthwise opening —24— coaxial with the spindle —a— to allow the work, as —B—, to pass therethrough as it is operated upon by the tool —11—.

The work-centering device comprises a supplemental head or plate —25— mounted transversely within and upon the head —1— and adjustable axially of the spindle —a— along and upon the lower bars —5— and is guided in its lengthwise movement against lateral displacement by opposite guide ribs —26— and bolts —27— which are passed through lengthwise slots —28— in the bars —5— and are tapped into the adjacent edges of the plate —25— to clamp the same in its adjusted position.

This plate —25— is provided with a conical opening —29—coaxial with the spindle —a— for receiving a split cone chuck —30— having its inner end threaded for engagement by a nut —31— for tightening and releasing the chuck in and upon a work-centering tool —32— and firmly holding the latter in exact coaxial alinement with the axis of the spindle —a— and work —B— carried thereby.

This work-centering tool —32— is preferably provided at both ends with a drill or cutting point, either of which may be used to produce a central hole or centering socket —b— in the adjacent end of the work —B—, as shown more clearly in Fig. 2, said centering tool being allowed to extend entirely through the chuck —30—.

The end wall —4— and spindle —2— are provided with a central lengthwise socket —33— for receiving the adjacent end of the tool —32— as the work-centering device is adjusted toward the end wall —4—.

This plate —25— is provided with a series of, in this instance three, radial ways —34— spaced equi-distant apart circumferentially about the axis of the chuck —30— for receiving a corresponding number of radially moving blocks —35— carrying at their inner ends roller bearings —36— for engaging the periphery of the adjacent end of the work —B— and steadying the same against vibration during the formation of the centering hole —b— by the tool —32—.

The portion of the plate —25— having the lower guide-way —34— is extended downwardly between and against the adjacent edges of the bars —5— of the head —1—, as shown more clearly in Fig. 4, to additionally guide the centering device in its lengthwise movement, and thereby assist in keeping the centering tool —32— exactly coaxial with the rotary work-holding spindle —a—.

These blocks —35— with the roller bearings —36— thereon are adapted to be adjusted radially by screws —37— and are held in their adjusted position by clamping bolts —38—.

The adjusting screws —37— are engaged in threaded apertures —39— in flanged sections —40— of the plate —25—, said sections being secured to the main body of the plate by clamping bolts —41—.

The ways —34— and adjacent edges of the blocks —35— are slightly dove-tail in cross section to retain the blocks more securely in operative position upon the plate —25— so that by making the sections —40— removable, the blocks may be inserted and removed readily.

The clamping bolts —38— for holding the blocks in their adjusted position are passed through radially elongated openings —42— in the plate —25— to allow ample clearance for the radial adjustment of said blocks with the rollers —36— thereon, according to the diameter of the work which is to be engaged by the rollers.

The carriage —A— may be the same as that usually employed in screw machines of this character for feeding a tool-holder, as the head —1—, and its cutting tool, as —11—, to and from the work, the degree of movement of the carriage depending upon the length of the work, as —B—, to be operated upon, or distance from the end of the work along which the tool —11— is adapted to be moved for completing the work, and the object in providing for the adjustment of the work-centering device along and upon the tool-supporting head —1— is to enable the centering tool to be positioned so as to make the centering hole —b— simultaneously with the completion of the work by the tool —11—, whereupon the head with both the cutting tool —11— and centering tool —32— thereon may be withdrawn from the work, and the latter cut off to the desired length from the main body of the rod, of which it formed a part, with the assurance that the completed article will be provided with means whereby it may be accurately centered in a lathe or similar machine for further finishing operations if necessary.

In the automatic multiple spindle type of screw machine shown in Figs. 5 to 8, inclusive, the rotary work-supporting spindles —a— carrying the work —B— may be shifted bodily and intermittingly about the axis of a lengthwise guide rod —50— by any of the well-known forms of indexing devices, not shown, commonly used in this class of machines for successively registering the work carried by each of the spindles —a— with the several cutting tools, not shown.

A tool-supporting head —1'— is movable lengthwise of and upon the guide rod —50— and is provided with a series of, in this instance four, lengthwise slots —51— of T-shape cross section and equally spaced circumferentially to receive corresponding heads of clamping bolts —52— by which the tools may be clamped to the head and adjusted longitudinally thereof to the desired positions for operating upon the work as may be required.

A work-centering device —53— is mounted upon the head —1'— and comprises a supplemental head —25'— mounted upon one of the slotted corners of the main supporting head —2— for lengthwise adjustment thereof and held in place by one or more clamping bolts —52— similar to those which hold the cutting tools on the main head —1'—, said supplemental head being preferably secured in the same slot which received the tool performing the finishing operation upon the work so that the centering device may be brought into operation for making a centering hole in the end of the work simultaneously with the finishing of the work in the machine.

The supplemental head —25'— is provided with a lengthwise cylindrical bore —54— parallel with the axes of the guide rod —50— and spindles —a— and is divided diametrically to form a removable cap section —54'— which is secured to the main section by clamping bolts —55—.

A hollow sleeve or tube —56— is inserted in the bore —54— and rigidly clamped in place by the tightening of the cap section —54'— and is provided at one end with a reduced threaded portion for receiving an internally threaded flange section —56'—.

A plate —57— is secured by clamping screws —59— to the opposite end face of the sleeve —56— and is provided with a relatively large opening —58— coaxial with the central opening in the sleeve —56— to permit the entrance of the adjacent end of the work —B— and the center cutting tool —32—.

This centering tool —32— is similar to that previously described and is held in a split chuck —30'— which in turn is supported in one end of a rotary spindle —60— having a threaded end cap —61— for retaining the chuck in operative position in the adjacent end of the spindle and for tightening and releasing said chuck upon and from the centering tool —32—.

The rotary spindle —60— is journaled in suitable bearings —62— in the ends of the sleeve —56— and is provided with a reduced extension —60'— having a threaded portion —63— adapted to be engaged by a nut —64— and washers —65—.

The flanged section —56'— of the sleeve —56— projects between the washers —65— and adjacent end of the enlarged portion of the spindle —60— to hold said spindle against endwise movement in the sleeve, and at the same time permitting it to rotate freely for rotating the centering tool —32—.

The spindle —60— with its centering tool —32— is preferably rotated in a direction opposite to that of the work-supporting spindle —a—, and for this purpose is provided with a gear —66— meshing with a similar gear —67— which may be driven by certain parts of the machine not necessary to herein illustrate or describe.

The gear —66— is held against endwise movement by a stationary forked yoke —68— on the frame —C— of the machine, said gear being feathered upon the extension —60'— of the spindle —60— to allow the work-centering device to be moved back and forth endwise with the head —1'— along the guide rod —50— in the operation of finishing and centering the work.

The plate —57— is similar in some respects to the plate —25— shown in Figs. 1 to 5, inclusive, in that it is provided with a plurality of, in this instance three, radial ways —34'— spaced uniform distances apart circumferentially about the axis of the spindle —60— and in close proximity to the cutting end of the centering tool —32— for receiving a corresponding number of radially adjustable blocks —35'— carrying at their inner ends roller bearings —36'— for engaging and steadying the end of the work —B— while the centering hole therein is being made by the tool —32—.

The roller supporting blocks —35'— are adapted to be adjusted radially by screws —37'— which are engaged in threaded apertures in flanged sections —40'— of the plate —57—, said flanged members being secured to the main body of the plate —57— by clamping screws —41'— in a manner similar to that previously described for the sections —40— of the plate —25—, Figs. 1 to 4, inclusive, said blocks being secured in their adjusted positions to the plate —57— by clamping screws —38'— which are arranged in radially elongated slots —42'— in the plate —57— in a manner similar to that described for the construction shown in Fig. 2.

In Fig. 9, we have shown a modified form of holder for the work-centering tool —32— consisting of a sleeve —70— securely clamped in the supplemental head —1'— and provided with a central tapering socket —71— for receiving a similarly tapered tool-holding chuck —72— in which the tool —32— is held, one end of the chuck being provided with a threaded socket —73— engaged by the threaded end of an adjusting screw —74— which extends through an opening in the outer end of the sleeve and is provided with a shoulder —74'— for engaging the adjacent end of said sleeve, whereby the turning of the screw in opposite directions will tighten and release the chuck upon and from the centering tool —32—.

Otherwise, the construction of the plate —57— which is secured to the inner end face of the sleeve and parts carried thereby is similar to that shown in Figs. 5 and 6.

The object in providing for the adjustment of the work-centering device along and upon the head —1'— is similar to that described for the adjustment of the plate —25— upon the head —1—; viz;—to cause the centering tool to drill a centering hole in the end of the work simultaneously with the finishing of the work by another tool on the head —1'— just prior to the removal of the finished work from the machine so that the finished product may be accurately centered in another lathe or similar machine for further operations if necessary.

The object in rotating the spindle —60— carrying the centering tool —32— in a direction opposite that of the work-holder is to expedite the centering operation and to reduce the liability of breaking the drills which are necessarily small.

Assuming that the work, as —B—, is to be turned down to a certain size throughout a definite portion of its length by a suitable tool used in this type of machine which necessitates a certain degree of movement of the tool-carrying head, as —1— or —1'—, corresponding to the length of the part of the work which is to be reduced.

Under these conditions, the work-centering device would be set to such position as would cause the centering tool —32— to drill a small hole centrally in the end of the work at the same time that the main cutting tool for reducing the diameter of the work reached the end of its movement, such operations being effected by the forward and backward movement of the head upon which the centering device and cutting tools are mounted, whereupon the finished work with the centering hole in the end thereof may be cut off in the usual manner, not necessary to herein illustrate or describe.

What we claim is:

1. In a screw machine, the combination of a rotary work-holder, a head movable back and forth lengthwise of the axis of the work-holder, a supplemental head adjustable lengthwise of and upon the first-named head, means for clamping the supplemental head in its adjusted position, a work-centering tool mounted on the supplemental head coaxial with the axis of the work for making a centering hole in the end of the work, and means on the head for supporting a separate tool in advance of the centering tool to operate upon the periphery of the work.

2. In a screw machine, the combination of a rotary work-holder, a head movable back and forth lengthwise of the axis of the work-holder, a supplemental head adjustable lengthwise of and upon the first-named head, means for clamping the supplemental head in its adjusted position, a work-centering tool mounted on the supplemental head coaxial with the axis of the work for making a centering hole in the end of the work, means on the head for supporting a separate tool in advance of the centering tool to operate upon the periphery of the work, and means on the supplemental head for engaging and steadying the periphery of the end of the work operated upon by the centering tool.

3. In a screw machine, the combination of a rotary work-holder, a head movable back and forth lengthwise of the axis of the work-holder, a supplemental head adjustable lengthwise of and upon the first-named head, means for clamping the supplemental head in its adjusted position, a work-centering tool mounted on the supplemental head coaxial with the axis of the work for making a centering hole in the end of the work, means on the head for supporting a separate tool in advance of the centering tool to operate upon the periphery of the work, and radially adjustable bearings mounted on the supplemental head for engaging and steadying the end of the work operated upon by said centering tool.

In witness whereof we have hereunto set our hands this 16th day of April, 1917.

JOHN F. MURPHY.
BERNARD A. RYAN.

Witnesses:
H. E. CHASE,
ALICE M. CANNON.

Copies of this patent may be obtained for five cents each, by addressing the "Commissioner of Patents, Washington, D. C."